United States Patent
Cooley

(10) Patent No.: US 8,549,623 B1
(45) Date of Patent: Oct. 1, 2013

(54) DETECTING SUSPICIOUS DOMAINS USING DOMAIN PROFILING

(75) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1194 days.

(21) Appl. No.: 12/055,050

(22) Filed: Mar. 25, 2008

(51) Int. Cl.
*G06F 11/00* (2006.01)

(52) U.S. Cl.
USPC ............... 726/22; 726/12; 713/151; 713/153; 713/189

(58) Field of Classification Search
USPC .......................................................... 726/22
See application file for complete search history.

(56) References Cited

U.S. PATENT DOCUMENTS

| 7,027,408 B2 * | 4/2006 | Nabkel et al. ................. 370/252 |
| 2006/0212930 A1 * | 9/2006 | Shull et al. ...................... 726/10 |

* cited by examiner

Primary Examiner — Shewaye Gelagay
(74) Attorney, Agent, or Firm — Brill Law Office; Jeffrey Brill

(57) ABSTRACT

Outbound communication from a computer is monitored, and requests to access remote links are identified. This process identifies attempts by users to access links provided by third parties in emails and such, as well other attempts by users to access remote domains. Domains in the identified requests are profiled, by testing them for properties associated with known legitimate domains, and for properties associated with known fraudulent domains. A trustworthiness score for a domain is calculated based on the results of the profiling. The trustworthiness score is compared to a predetermined threshold, and from the results it is determined whether or not the domain is legitimate. If the domain is fraudulent, appropriate action is taken, such as blocking the attempt to access the domain.

17 Claims, 1 Drawing Sheet

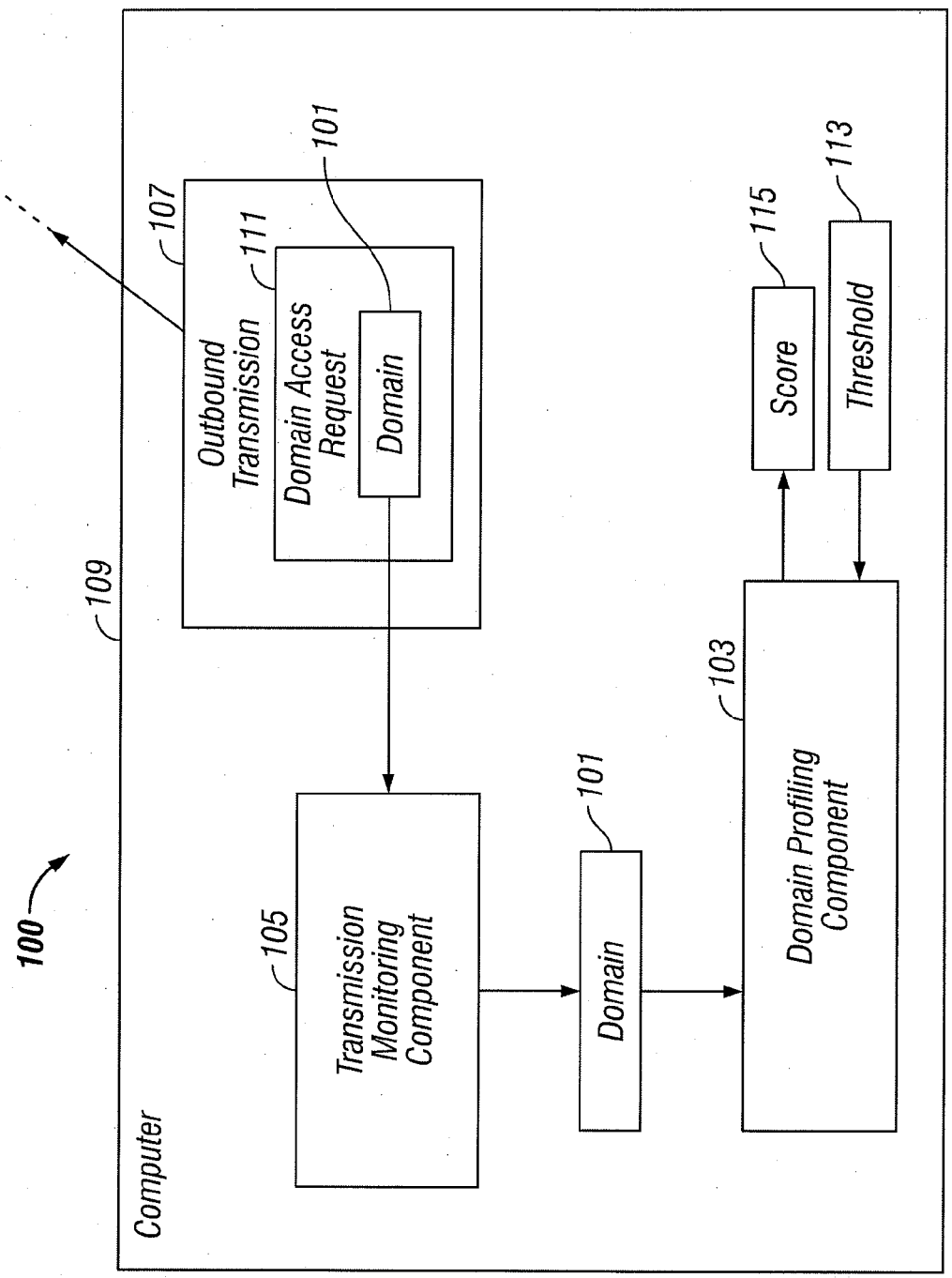

US 8,549,623 B1

DETECTING SUSPICIOUS DOMAINS USING DOMAIN PROFILING

TECHNICAL FIELD

This invention pertains generally to computer security, and more specifically to detecting suspicious domains through the use of domain profiling.

BACKGROUND

Phishing is a serious computer security threat. Phishing involves an attempt to criminally and fraudulently acquire sensitive information, such as usernames, passwords and credit card details, by masquerading as a trustworthy entity (e.g., eBay, PayPal, a known bank) in an electronic communication. Phishing is typically carried out by email or instant messaging, and directs users to enter details at a fraudulent website which is disguised to look legitimate. Once the user enters the personal information, it is used for fraudulent purposes such as identity theft.

Anti-phishing software packages exist today, which employ various technical solutions to detect and block phishing attacks. Such anti-phishing solutions attempt to identify websites that users are being directed towards in electronic communications, and distinguish between legitimate and fraudulent websites. An electronic communication encouraging a user to link to a non-legitimate website can be identified as a phishing attack.

Unfortunately, phishing attacks are becoming ever more sophisticated, and consequently phishing web sites are becoming progressively more difficult to programmatically detect. Phishing groups such as Rock Phish are increasingly using more advanced techniques such as enterprise style failover and redundancy. These strategies ensure maximum uptime of their fraudulent web sites, while also reducing the ability to detect their attacks. One weakness still present in these techniques is their rampant use of throw-away domain names. These and other phishing techniques frequently change the fraudulent domains that they utilize to attempt to trick users into entering personal information.

It would be desirable to be able to reliably detect more types of phishing attacks, including those utilizing enterprise style failover and redundancy techniques.

SUMMARY

Links in emails and other electronic communications are profiled, to determine whether a link is to a legitimate or a fraudulent domain. More specifically, outbound communication from a computer is monitored, and requests to access remote links are identified. This process identifies attempts by users to access links provided by third parties in emails and such, as well other attempts by users to access remote domains. Domains in the identified requests are profiled, by testing them for properties associated with known legitimate domains, and for properties associated with known fraudulent domains. A trustworthiness score for a domain is calculated based on the results of the profiling. The trustworthiness score is compared to a predetermined threshold, and from the results it is determined whether or not the domain is legitimate. If the domain is fraudulent, appropriate action is taken. For example, the attempt to access the domain can be blocked, the user can be warned that the domain is fraudulent, information concerning the domain can be reported to a computer security service, etc.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a block diagram illustrating a system for detecting suspicious domains through the use of domain profiling, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 for detecting suspicious domains 101 through the use of domain 101 profiling, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a domain profiling component 103 profiles domains 101, to determine their trustworthiness. By inspecting a domain 101 and its associated properties, the domain profiling component 103 can programmatically determine whether the domain 101 is or is not legitimate. A transmission monitoring component 105 monitors outbound transmissions 107 originating from a computer 109, and identifies requests 111 to access remote domains 101 (e.g., by identifying a Uniform Resource Locator ("URL") in the request 111). In one embodiment, the transmission monitoring component 105 comprises a Hypertext Transfer Protocol ("HTTP") proxy (either local, as illustrated, or remote) that is capable of detecting domain access requests 111 in the outbound HTTP stream. In another embodiment, the transmission monitoring component 105 is instantiated as a web browser plug-in that has access to domain access requests 111. In any case, when a domain access request 111 is detected in an outbound transmission 107, enough information from the request 111 to profile the domain 101 targeted thereby (e.g., the URL, the whole request 111, the resolved domain name, etc.) is passed to the domain profiling component 103 to be profiled.

The implementation mechanics of detecting domain access requests 111 in outbound transmissions 107 and instantiating (local and remote) HTTP proxies and web browser plug-ins are known to those of ordinary skill in the relevant art. The use thereof within the context of the present invention will be readily apparent to one of such a skill level in light of this specification. In FIG. 1 the domain profiling component 103 is illustrated as running on the local computer. In other embodiments, the domain profiling component 103 runs remotely, for example on a central server (not illustrated).

The domain profiling component 103 takes each domain 101 that is passed in, and performs a wide range of profiling methods thereon, with the goal of providing a score 113 which functions as a measure of trustworthiness. It is understood by those of ordinary skill in the relevant art that various properties are associated with legitimate domains 101, and various other properties with fraudulent domains 101. The domain profiling component 103 tests domains 101 for known properties. The profiling methodologies can include but are not limited to those described below. No single profiling method is a definitive test to determine whether a domain is legitimate or not. However, by running a plurality of tests and scoring the results, the domain profiling component 103 is able to determine with an acceptable level of accuracy whether a given domain is or is not fraudulent.

It is to be understood that which of the following or other tests to perform is a variable design parameter. It is to be further understood that the profiling tests explained below are simply examples. Other possible profiling tests will be readily apparent to one of ordinary skill in the relevant art in light of this specification. Additionally, how specifically to calculate the score 113 based on the test results is also a variable design parameter. Depending upon the tolerance or lack thereof for false positives and/or false negatives, the current trends in phishing attacks, etc., the trustworthiness score 113 can be increased or decreased by desired amounts according to the results of the various performed profiling tests. Different weights can be assigned to different test results as desired.

The length of time a domain 101 has been in existence can be checked. The more recently a domain 101 was registered, the more likely it is fraudulent. Although a recently registered domain 101 could be legitimate, phishing attacks recycle domains 101 very rapidly, whereas legitimate websites remain in use for long periods of time. Domains 101 that have been in existence for longer than a given time period (e.g., one year), are considered to be progressively less likely to be fraudulent based on age.

If the domain name 101 is found on a list of free anonymous web hosts (such as geocities.com), the likelihood of fraud is adjudicated as being greater. Such hosts are frequently used in phishing attacks because of their anonymity. The Internet Protocol ("IP") address of the hosting server IP for the domain name 101 can be checked against a list of Digital Subscriber Line ("DSL"), cable modem or dialup network IP address ranges. If the domain 101 is found to be hosted on an IP address in one of these ranges, the likelihood of fraud is considered to be greater. On the other hand, if the domain name 101 is found to be hosted on a large co-location network (such as Akamai), the trust level increases.

If the domain name 101 is found in a well known and trusted directory (e.g., the Yahoo! Directory, DMOZ/Google Directory), the trust level is increased (proportional to the number of entries found). Additionally, if the domain name 101 is assigned to the same entity as the resolved IP address, the trust level increases (there is typically no penalty for a mismatch). This test indicates whether a company is large enough to host their own servers, a sign of legitimacy.

The fraud level is increased as the number of sub-domains 101 increases. For example, www.name.com is considered less likely to be fraudulent than abc.xyz.qfp.lfm.name.com. If the domain name 101 uses a high-fraud top level domain ("TLD"), such as .info or .biz, the fraud level is increased.

Additionally, if the link is requesting that the recipient connect on a nonstandard port (e.g., a port other than 80/443), the fraud level is increased.

If the geo-location of the registered owner, technical contact, or domain contact is in close proximity to the geo-location associated with the IP address, the fraud level is decreased. If the expiration date of the domain 101 is more than, e.g., one year away, the fraud level is decreased. If the server has an associated valid Secure Socket Layer ("SSL") certificate (e.g., a port 443 connection is made), the fraud level is decreased.

After the desired profiling tests are performed on the domain 101, the resulting score 113 is compared to a predetermined threshold 115. Of course, the specific threshold 115 to use is a variable design parameter. Depending upon the calculated score 113 relative to the predetermined threshold 115, the domain 101 is identified as either fraudulent or legitimate. If the domain 101 is adjudicated as being legitimate, the user is typically allowed to access it. If the domain 101 is identified as being fraudulent, various possible steps can be taken as desired. For example, the user could be cautioned, the attempted access could be blocked, the domain 101 could be reported to a central security service, etc.

In the above described embodiment, the domain profiling component 103 performs specific profiling tests and adjusts the trustworthiness score 113 up or down based on the results. In another embodiment, the domain profiling component 103 is implemented as a statistical engine such as a neural network or Bayesian filter (not illustrated) that executes similar logic, in which desired profiling tests are features. The statistical engine is trained from known legitimate and known fraudulent domains 101 to produce a more statistically correct weighting for the various features. The implementation mechanics of instantiating a statistical engine that performs such statistical analysis is within the skill set of one of ordinary skill in relevant art, and the use thereof will be readily apparent to one of such a skill level in light of this specification.

It is to be understood that domain 101 profiling as described herein is a very useful tool in the detection and management of phishing attacks. Of course, such profiling of domains 101 is not limited to anti-phishing solutions, but can also be utilized in any implementation in which it is desirable to distinguish between legitimate and illegitimate domains 101.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for determining domain legitimacy, the method comprising the steps of:
    monitoring outbound transmissions originating from a computer;
    identifying requests to access remote domains in the monitored outbound transmissions;
    responsive to identifying a request to access a remote domain, profiling the remote domain by collecting information regarding network configurations associated with the remote domain that are indicative of trustworthiness, wherein profiling the remote domain further comprises performing a plurality of profiling tests on the remote domain, the plurality of profiling tests testing the remote domain for properties known to be associated with legitimate domains and for properties known to be associated with fraudulent domains;
    calculating a trustworthiness score for the remote domain based on results of the profiling, wherein calculating the trustworthiness score for the remote domain further comprises adjusting the trustworthiness score according to results of the plurality of profiling tests;
    comparing the calculated trustworthiness score to a predetermined threshold; and
    responsive to results of the comparing step, determining whether the remote domain is legitimate.

2. The method of claim 1 wherein the steps of monitoring outbound transmissions originating from a computer and identifying requests to access remote domains in the monitored outbound transmissions are performed by a component from a group of components consisting of:
    a local HTTP proxy;
    a remote HTTP proxy; and
    a browser plug-in.

3. The method of claim 1 wherein the step of profiling the domain further comprises performing at least one step from a group of steps consisting of:
    determining a length of time the domain has been in existence;
    determining whether the domain is hosted by a free anonymous web host;
    determining whether the IP address of a server hosting the domain is within a range of IP addresses associated with DSL;
    determining whether the IP address of a server hosting the domain is within a range of IP addresses associated with cable modem;
    determining whether the IP address of a server hosting the domain is within a range of IP addresses associated with dialup connections;
    determining whether the domain is hosted on a co-location network;
    determining whether the domain is listed in a trusted directory;
    determining whether the domain is assigned to the same entity as an IP address of the domain;
    determining a number of sub-domains associated with the domain;
    determining whether the domain uses a high-fraud TLD;
    determining whether the domain directs a recipient to connect to the domain via a nonstandard port;
    determining whether a geo-location associated with an IP address of the domain is within a specified physical proximity to a geo-location associated with a person associated with the domain;
    determining an expiration date of the domain; and
    determining whether a server hosting the domain has a valid SSL certificate.

4. The method of claim 1 further comprising:
    determining that the domain is legitimate; and
    responsive to the determination, allowing access to the domain.

5. The method of claim 1 further comprising:
    determining that the domain is fraudulent; and
    responsive to the determination, performing at least one step from a group of steps consisting of:
        blocking access to the domain;
        warning a user concerning the domain;
        transmitting information concerning the domain to a central server; and
        determining that the domain is being used for phishing attacks.

6. The method of claim 1 wherein the steps of profiling the domain and calculating a trustworthiness score for the domain further comprise:
    providing a statistical engine that tests domains for properties known to be associated with legitimate domains and for properties known to be associated with fraudulent domains;
    training the statistical engine on both known legitimate domains and known fraudulent domains, such that the statistical engine produces more statistically accurate weightings; and
    profiling the domain and calculating a trustworthiness score for the domain by the trained statistical engine.

7. At least one non-transitory computer readable medium storing a computer program product for determining domain legitimacy, the computer program product comprising:
    program code for monitoring outbound transmissions originating from a computer;
    program code for identifying requests to access remote domains in the monitored outbound transmissions;
    program code for, responsive to identifying a request to access a remote domain, profiling the remote domain by collecting information regarding network configurations associated with the remote domain that are indicative of trustworthiness, wherein profiling the remote domain further comprises performing a plurality of profiling tests on the remote domain, the plurality of profiling tests testing the remote domain for properties known to be associated with legitimate domains and for properties known to be associated with fraudulent domains;
    program code for calculating a trustworthiness score for the remote domain based on results of the profiling, wherein calculating the trustworthiness score for the remote domain further comprises adjusting the trustworthiness score according to results of the plurality of profiling tests;

program code for comparing the calculated trustworthiness score to a predetermined threshold; and program code for, responsive to results of the comparing step, determining whether the remote domain is legitimate.

8. The computer program product of claim 7 further comprising program code for performing the steps of monitoring outbound transmissions originating from a computer and identifying requests to access remote domains in the monitored outbound transmissions by a component from a group of components consisting of:
   a local HTTP proxy;
   a remote HTTP proxy; and
   a browser plug-in.

9. The computer program product of claim 7 wherein the program code for profiling the domain further comprises program code for performing at least one step from a group of steps consisting of:
   determining a length of time the domain has been in existence;
   determining whether the domain is hosted by a free anonymous web host;
   determining whether the IP address of a server hosting the domain is within a range of IP addresses associated with DSL;
   determining whether the IP address of a server hosting the domain is within a range of IP addresses associated with cable modem;
   determining whether the IP address of a server hosting the domain is within a range of IP addresses associated with dialup connections;
   determining whether the domain is hosted on a co-location network;
   determining whether the domain is listed in a trusted directory;
   determining whether the domain is assigned to the same entity as an IP address of the domain;
   determining a number of sub-domains associated with the domain;
   determining whether the domain uses a high-fraud TLD;
   determining whether the domain directs a recipient to connect to the domain via a nonstandard port;
   determining whether a geo-location associated with an IP address of the domain is within a specified physical proximity to a geo-location associated with a person associated with the domain;
   determining an expiration date of the domain; and
   determining whether a server hosting the domain has a valid SSL certificate.

10. The computer program product of claim 7 further comprising:
    program code for determining that the domain is legitimate; and
    responsive to the determination, allowing access to the domain.

11. The computer program product of claim 7 further comprising:
    program code for determining that the domain is fraudulent; and
    program code for, responsive to the determination, performing at least one step from a group of steps consisting of:
       blocking access to the domain;
       warning a user concerning the domain;
       transmitting information concerning the domain to a central server; and
       determining that the domain is being used for phishing attacks.

12. The computer program product of claim 7 wherein the program code for profiling the domain and calculating a trustworthiness score for the domain further comprises:
    program code for providing a statistical engine that tests domains for properties known to be associated with legitimate domains and for properties known to be associated with fraudulent domains;
    program code for training the statistical engine on both known legitimate domains and known fraudulent domains, such that the statistical engine produces more statistically accurate weightings; and
    program code for profiling the domain and calculating a trustworthiness score for the domain by the trained statistical engine.

13. A computer system for determining domain legitimacy, the computer system comprising:
    means for monitoring outbound transmissions originating from a computer;
    means for identifying requests to access remote domains in the monitored outbound transmissions;
    means for, responsive to identifying a request to access a remote domain, profiling the remote domain by collecting information regarding network configurations associated with the remote domain that are indicative of trustworthiness, wherein profiling the remote domain further comprises performing a plurality of profiling tests on the remote domain, the plurality of profiling tests testing the remote domain for properties known to be associated with legitimate domains and for properties known to be associated with fraudulent domains;
    means for calculating a trustworthiness score for the remote domain based on results of the profiling, wherein calculating the trustworthiness score for the remote domain further comprises adjusting the trustworthiness score according to results of the plurality of profiling tests;
    means for comparing the calculated trustworthiness score to a predetermined threshold; and
    means for, responsive to results of the comparing step, determining whether the remote domain is legitimate.

14. The computer system of claim 13 further comprising means for performing the steps of monitoring outbound transmissions originating from a computer and identifying requests to access remote domains in the monitored outbound transmissions by a component from a group of components consisting of:
    a local HTTP proxy;
    a remote HTTP proxy; and
    a browser plug-in.

15. The computer system of claim 13 wherein the means for profiling the domain further comprise means for performing at least one step from a group of steps consisting of:
    determining a length of time the domain has been in existence;
    determining whether the domain is hosted by a free anonymous web host;
    determining whether the IP address of a server hosting the domain is within a range of IP addresses associated with DSL;
    determining whether the IP address of a server hosting the domain is within a range of IP addresses associated with cable modem;
    determining whether the IP address of a server hosting the domain is within a range of IP addresses associated with dialup connections;

determining whether the domain is hosted on a co-location network;

determining whether the domain is listed in a trusted directory;

determining whether the domain is assigned to the same entity as an IP address of the domain;

determining a number of sub-domains associated with the domain;

determining whether the domain uses a high-fraud TLD;

determining whether the domain directs a recipient to connect to the domain via a nonstandard port;

determining whether a geo-location associated with an IP address of the domain is within a specified physical proximity to a geo-location associated with a person associated with the domain;

determining an expiration date of the domain; and determining whether a server hosting the domain has a valid SSL certificate.

16. The computer system of claim 13 further comprising:

means for determining that the domain is fraudulent; and means for, responsive to the determination, performing at least one step from a group of steps consisting of:

blocking access to the domain;

warning a user concerning the domain;

transmitting information concerning the domain to a central server; and determining that the domain is being used for phishing attacks.

17. The computer system of claim 13 wherein the means for profiling the domain and calculating a trustworthiness score for the domain further comprise:

means for providing a statistical engine that tests domains for properties known to be associated with legitimate domains and for properties known to be associated with fraudulent domains;

means for training the statistical engine on both known legitimate domains and known fraudulent domains, such that the statistical engine produces more statistically accurate weightings; and means for profiling the domain and calculating a trustworthiness score for the domain by the trained statistical engine.

* * * * *